United States Patent
Ritter, II et al.

(10) Patent No.: US 6,550,729 B1
(45) Date of Patent: Apr. 22, 2003

(54) SUPPORT SYSTEM FOR A COOKING APPARATUS

(76) Inventors: John S. Ritter, II, 1839 Hill Top Ter., Bethlehem, PA (US) 18018; John S. Ritter, 2640 Nottingham Rd., Bethlehem, PA (US) 18017

( * ) Notice: Subject to any disclaimer, the term of this patent is extended or adjusted under 35 U.S.C. 154(b) by 0 days.

(21) Appl. No.: 09/802,568

(22) Filed: Mar. 9, 2001

(51) Int. Cl.[7] .............................................. A47B 96/06
(52) U.S. Cl. ........................................ 248/214; 126/50
(58) Field of Search ............................. 248/311.2, 310, 248/315, 304, 214, 215; 126/41 R, 24

(56) References Cited

U.S. PATENT DOCUMENTS

| | | | |
|---|---|---|---|
| 3,987,993 A | * 10/1976 | Hopkins | 248/210 |
| 4,059,248 A | 11/1977 | Kuntz | |
| 4,322,049 A | * 3/1982 | Holland et al. | 245/154 |
| 4,413,515 A | * 11/1983 | Quinn | 73/296 |
| 4,557,452 A | * 12/1985 | Khuong | 248/214 |
| 4,798,362 A | * 1/1989 | Troutner | 248/62 |
| 5,009,380 A | * 4/1991 | Fee | 248/214 |
| 5,033,448 A | * 7/1991 | Sandweg | 126/25 R |
| 5,037,051 A | * 8/1991 | Moriello | 248/215 |
| 5,127,188 A | * 7/1992 | Shaw et al. | 47/68 |
| 5,148,755 A | * 9/1992 | Morales | 108/47 |
| 5,165,384 A | 11/1992 | Knutson | |
| D332,212 S | 1/1993 | Mitchell et al. | |
| 5,411,011 A | * 5/1995 | Teta | 126/50 |
| 5,472,164 A | 12/1995 | Contee | |
| 5,582,376 A | * 12/1996 | Thompson | 248/214 |
| 5,597,288 A | * 1/1997 | Hatanaka | 415/182.1 |
| D392,081 S | * 3/1998 | Salvucci, Sr. | D34/27 |
| 5,738,319 A | * 4/1998 | Grassi | 248/215 |

\* cited by examiner

*Primary Examiner*—Ramon O. Ramirez
*Assistant Examiner*—Kofi Schulterbrandt

(57) ABSTRACT

A support system for a cooking apparatus for allowing a user to mount cooking apparatus to a deck rail. The support system for a cooking apparatus includes a pair of support members that are designed for support the cooking apparatus from the rail of the deck. Each of the support members includes a securing portion that is designed to be removably coupled to the rail of the deck. A bracing portion is coupled to the securing portion such that the bracing portion is designed to support the cooking apparatus when the securing portion is coupled to the rail of the deck.

1 Claim, 3 Drawing Sheets

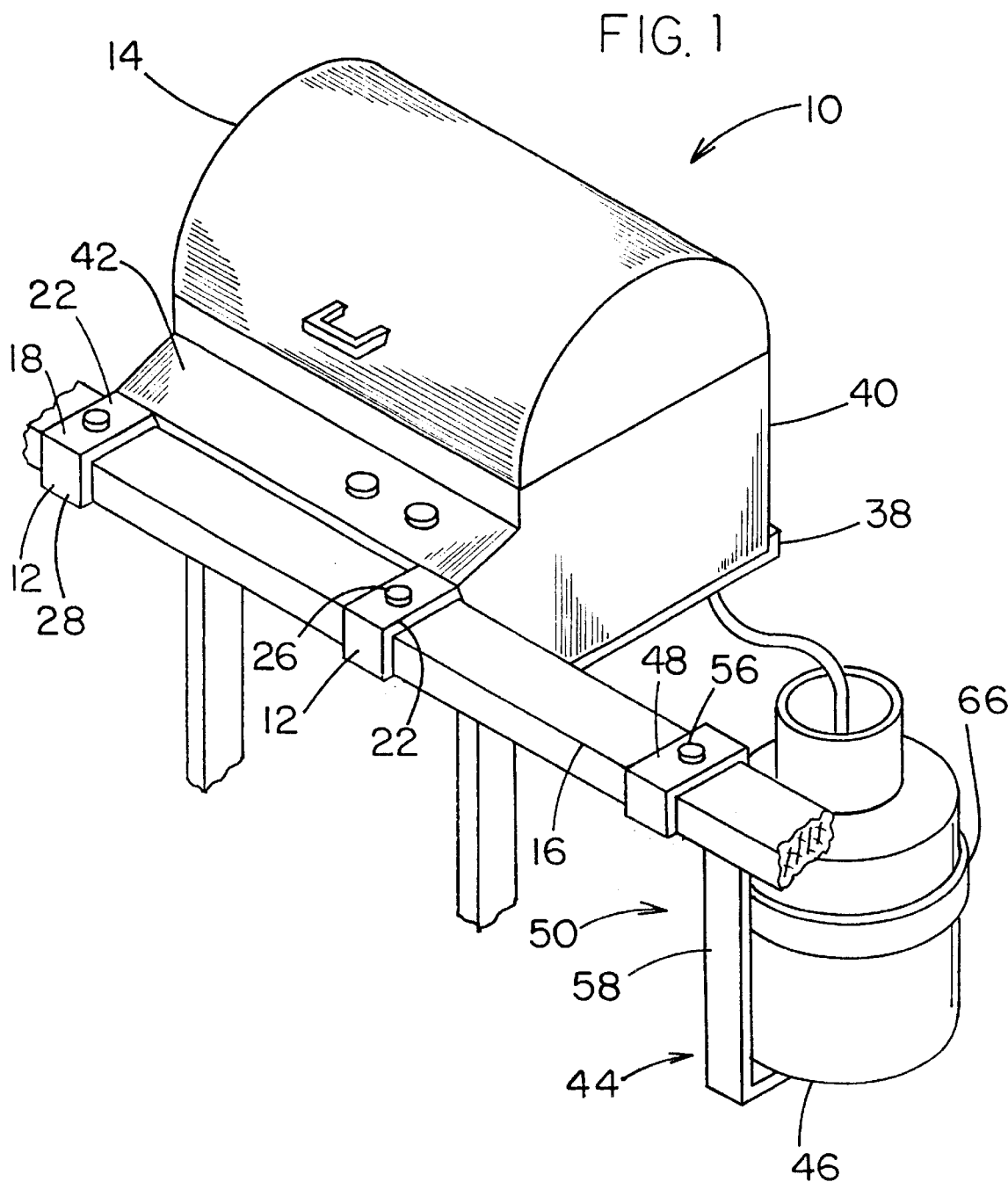

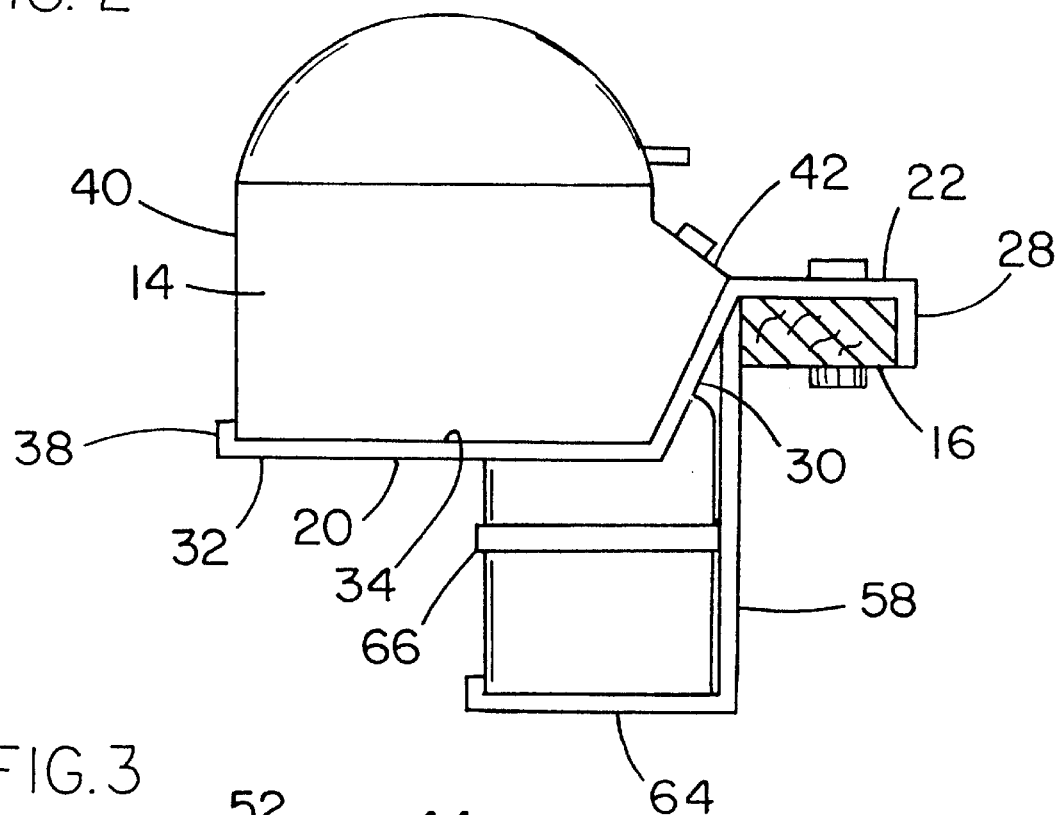
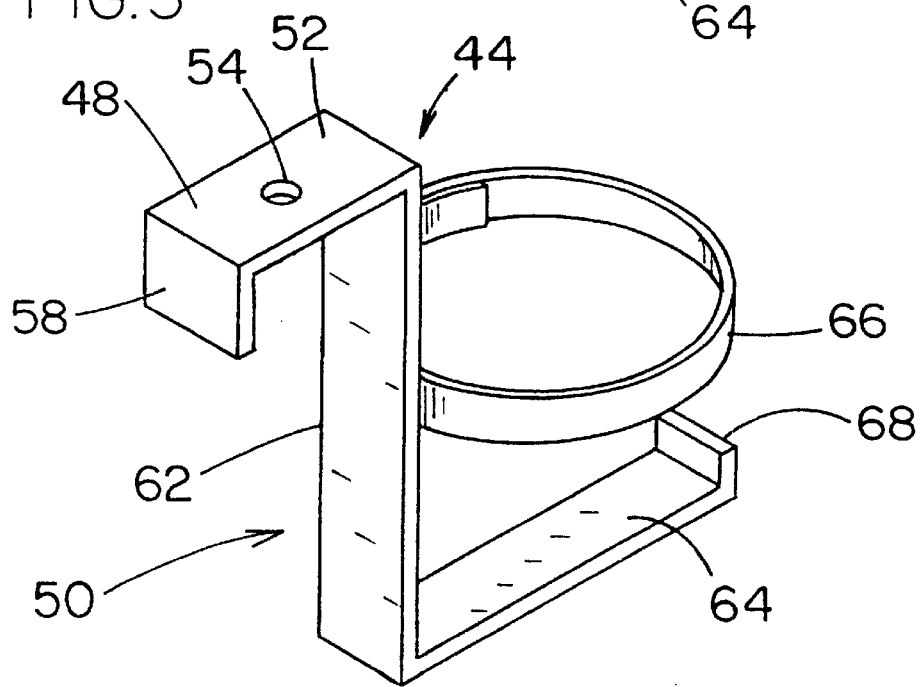

SUPPORT SYSTEM FOR A COOKING APPARATUS

BACKGROUND OF THE INVENTION

1. Field of the Invention

The present invention relates to cooking apparatus support systems and more particularly pertains to a new support system for a cooking apparatus for allowing a user to mount cooking apparatus a deck rail.

2. Description of the Prior Art

The use of cooking apparatus support systems is known in the prior art. More specifically, cooking apparatus support systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,472,164; 5,009,380; 5,165,384; 5,033,448, 4,059,248; and U.S. Pat. No. Des. 332,212.

While these devices fulfill their respective, particular objectives and requirements, the aforementioned patents do not disclose a new support system for a cooking apparatus. The inventive device includes a pair of support members that are designed for support of the cooking apparatus from the rail of the deck. Each of the support members includes a securing portion that is designed to be removably coupled to the rail of the deck. A bracing portion is coupled to the securing portion such that the bracing portion is designed to support the cooking apparatus when the securing portion is coupled to the rail of the deck.

In these respects, the support system for a cooking apparatus according to the present invention substantially departs from the conventional concepts and designs of the prior art, and in so doing provides an apparatus primarily developed for the purpose of allowing a user to mount the cooking apparatus to the outside of a deck rail.

SUMMARY OF THE INVENTION

In view of the foregoing disadvantages inherent in the known types of cooking apparatus support systems now present in the prior art, the present invention provides a new support system for a cooking apparatus construction wherein the same can be utilized for allowing a user to mount cooking apparatus to the outside of a deck rail.

The general purpose of the present invention, which will be described subsequently in greater detail, is to provide a new support system for a cooking apparatus and method which has many of the advantages of the cooking apparatus support systems mentioned heretofore and many novel features that result in a new support system for a cooking apparatus which is not anticipated, rendered obvious, suggested, or even implied by any of the prior art cooking apparatus support systems, either alone or in any combination thereof.

To attain this, the present invention generally comprises a pair of support members that are designed for support the cooking apparatus from the rail of the deck. Each of the support members includes a securing portion that is designed to be removably coupled to the rail of the deck. A bracing portion is coupled to the securing portion such that the bracing portion is designed to support the cooking apparatus when the securing portion is coupled to the rail of the deck.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new support system for a cooking apparatus apparatus and method which has many of the advantages of the cooking apparatus support systems mentioned heretofore and many novel features that result in a new support system for a cooking apparatus which is not anticipated, rendered obvious, suggested, or even implied by any of the prior art cooking apparatus support systems, either alone or in any combination thereof.

It is another object of the present invention to provide a new support system for a cooking apparatus which may be easily and efficiently manufactured and marketed.

It is a further object of the present invention to provide a new support system for a cooking apparatus which is of a durable and reliable construction.

An even further object of the present invention is to provide a new support system for a cooking apparatus which is susceptible of a low cost of manufacture with regard to both materials and labor, and which accordingly is then susceptible of low prices of sale to the consuming public, thereby making such support system for a cooking apparatus economically available to the buying public.

Still yet another object of the present invention is to provide a new support system for a cooking apparatus which provides in the apparatuses and methods of the prior art some of the advantages thereof, while simultaneously overcoming some of the disadvantages normally associated therewith.

Still another object of the present invention is to provide a new support system for a cooking apparatus for allowing a user to mount cooking apparatus to the ouside of a deck rail.

Yet another object of the present invention is to provide a new support system for a cooking apparatus which includes a pair of support members that are designed for support the cooking apparatus from the rail of the deck. Each of the support members include a securing portion that is designed to be removably coupled to the rail of the deck. A bracing portion is coupled to the securing portion such that the bracing portion is designed to support the cooking apparatus when the securing portion is coupled to the rail of the deck.

Still yet another object of the present invention is to provide a new support system for a cooking apparatus that would save considerable amounts of space on a deck, thus leaving more space for furniture as well as more walking space.

Even still another object of the present invention is to provide a new support system for a cooking apparatus that would be of eye-catching design and decorative appeal. This novel unit would also enhance safety as the hot surface would be out of the reach of children.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new support system for a cooking apparatus according to the present invention.

FIG. 2 is an end view of the present invention.

FIG. 3 is a perspective view of the present invention.

DESCRIPTION OF THE PREFERRED EMBODIMENT

Figure 4:
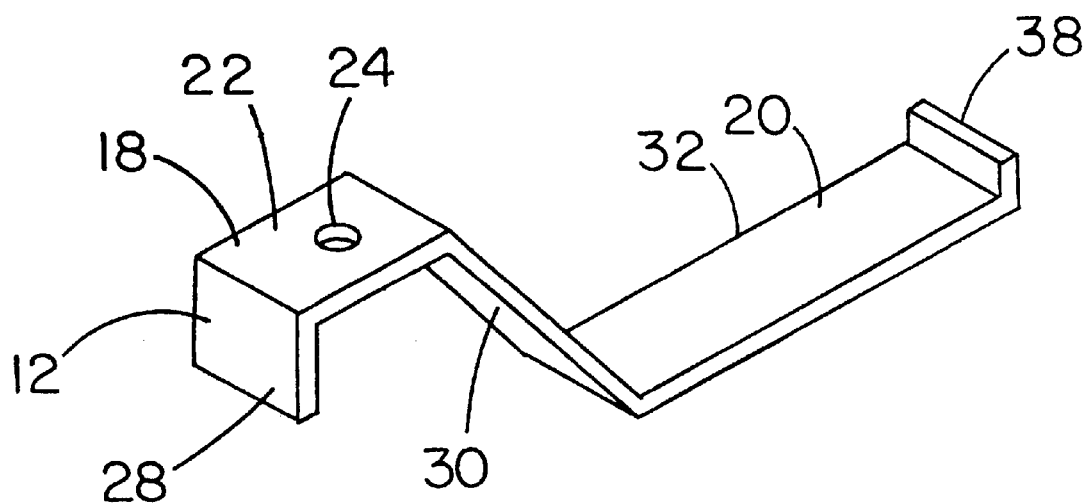
FIG. 4 is a perspective view of the present invention.

With reference now to the drawings, and in particular to FIGS. 1 through 4 thereof, a new support system for a cooking apparatus embodying the principles and concepts of the present invention and generally designated by the reference numeral 10 will be described.

As best illustrated in FIGS. 1 through 4, the support system for a cooking apparatus 10 generally includes a pair of support members 12 that are designed for support of the cooking apparatus 14 from the rail 16 of the deck. Each of the support members 12 includes a securing portion 18 that is designed to be removably coupled to the rail 16 of the deck. A bracing portion 20 is coupled to the securing portion 18 such that the bracing portion 20 is designed to support the cooking apparatus 14 when the securing portion 18 is coupled to the rail 16 of the deck.

The securing portion 18 of each of the support members 12 has a horizontal securing member 22 such that the horizontal securing member 22 is designed for securing to a top of the rail 16 of the deck. The horizontal securing member 22 has a bore 24 through the horizontal securing member 22 such that the bore 24 is for receiving a fastener 26 such that the fastener 26 is designed for securing the horizontal securing member 22 to the rail 16 of the deck. The securing portion 18 of each of the support members 12 has a vertical securing member 28 that downwardly extends from and end of the horizontal securing member 22 such that the vertical securing member 28 is designed for bracing the support member 12 against a front of a rail 16 of the deck.

The bracing portion 20 of each of the support members 12 has a leveling member 30 and a bracing member 32. The leveling member 30 is coupled between the securing portion 18 and the bracing member 32. The bracing member 32 is designed to be removably coupled to a bottom 34 of the cooking apparatus 14 such that the bracing member 32 is designed to support the cooking apparatus 14 when the securing portion 18 is secured to the rail 16 of the deck. The bracing portion 20 of each of the support members 12 has a stop member 38 that upwardly extends from the bracing member 32 opposite the leveling member 30 such that the stop member 38 is designed for abutting a rear 40 of the cooking apparatus 14. The stop member 38 is designed to prevent the cooking apparatus 14 from sliding off of the bracing member 32.

The leveling member 30 of the bracing portion 20 of each of the support members 12 extend at an angle between the bracing member 32 and the securing portion 18 such that the leveling member 30 is designed for positioning a control panel 42 of the cooking apparatus 14 whereby the control panel 42 is easily accessible.

A tank support member 44 is for releasably coupling to a rail 16 of a deck such that the tank support member 44 is designed to support a fuel supply 46 for the cooking apparatus 14 from the rail 16 of the deck. A tank securing portion 48 of the tank support member 44 is designed to be removably coupled to the rail 16 of the deck. A tank bracing portion 50 of the tank support member 44 is coupled to the tank securing portion 48 such that the tank bracing portion 50 is designed to support the fuel supply 46 when the tank securing portion 48 is coupled to the rail 16 of the deck.

The tank securing portion 48 of the tank support member 44 has a horizontal tank securing member 52 such that the horizontal tank securing member 52 is designed for securing to a top of the rail 16 of the deck. The horizontal tank securing member 52 has a bore 54 through the horizontal tank securing member 52 such that the bore 54 is for receiving a fastening member 56 such that the fastening member 56 is designed for securing the horizontal tank securing member 52 to the rail 16 of the deck.

The tank securing portion 48 of the tank support member 44 has a vertical tank securing member 58 that downwardly extends from and end of the horizontal tank securing member 52 such that the vertical tank securing member 58 is designed for bracing the tank support member 44 against a front of a rail 16 of the deck.

The tank bracing portion 50 of the tank support member 44 has a first member 62 that downwardly extends from the tank securing portion 48. A second member 64 horizontally extends from an end of the first member 62 such that the second member 64 is designed for supporting a bottom of the fuel supply 46 when the tank securing portion 48 is coupled to the rail 16 of the deck. The tank bracing portion 50 of the tank support member 44 has an annular ring 66 coupled to the first member 62 such that the annular ring 66 is designed for engaging sides of the fuel supply 46 whereby the annular ring 66 is designed for supporting the fuel supply 46. The tank bracing portion 50 of the tank support member 44 has a tab member 68 that upwardly extends from the second member 64 opposite the first member 62 such that the tab member 68 is designed to be engaged to a side of the fuel supply 46. The tab member 68 is designed for preventing the fuel supply 46 from sliding off of the second member 64.

In use, a user would mount the present invention to the rail of a deck using the novel brackets provided. A user would then cook on the present invention just like a conventional outdoor cooking device.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A cooking apparatus support system for attaching to a rail of a deck, the support system comprising:
    a cooking apparatus being adapted for cooking food;
    a pair of support members adapted for supporting said cooking apparatus from the rail of the deck, each of said support members comprising:
        a securing portion being adapted for being removably coupled to the rail of the deck;
        a bracing portion being coupled to said securing portion, said bracing portion being mounted on an underside of said cooking apparatus for supporting said cooking apparatus when said securing portion is coupled to the rail of the deck;
        said securing portion of each of said support members having a horizontal securing member such that said horizontal securing member is adapted for securing to a top of the rail of the deck, said horizontal securing member having a bore through said horizontal securing member such that said bore is for receiving a fastener such that said fastener is adapted for securing said horizontal securing member to the rail of the deck;
        said securing portion of each of said support members having a vertical securing member being downwardly extending from an end of said horizontal securing member such that said vertical securing member is adapted for bracing said support member against a front of a rail of the deck;
        said bracing portion of each of said support members having a leveling member and a bracing member, said leveling member being coupled between said securing portion and said bracing member, said bracing member being removably coupled to a bottom of said cooking apparatus such that said bracing member supports said cooking apparatus when said securing portion is secured to the rail of the deck;
        said bracing portion of each of said support members having a stop member extending upwardly from said bracing member opposite said leveling member such that said stop member abuts a rear of said cooking apparatus whereby said stop member prevents said cooking apparatus from sliding off of said bracing member;
        said leveling member of said bracing portion of each of said support members extending at an angle between said bracing member and said securing portion such that said leveling member positions a control panel of said cooking apparatus whereby the control panel is easily accessible;
    a fuel supply tank;
    a tank support member for releasably coupling to a rail of a deck to support said fuel supply for the cooking apparatus from the rail of the deck; said tank support member comprising:
        a tank securing portion of said tank support member for removably coupling to the rail of the deck;
        a tank bracing portion of said tank support member being coupled to said tank securing portion, said tank bracing portion removably receiving said fuel supply tank when said tank securing portion is coupled to the rail of the deck;
        said tank securing portion of said tank support member having a horizontal tank securing member for securing to a top of the rail of the deck, said horizontal tank securing member having a bore through said horizontal tank securing member for receiving a fastening member for securing said horizontal tank securing member to the rail of the deck;
        said tank securing portion of said tank support members having a vertical tank securing member being downwardly extending from an end of said horizontal tank securing member for bracing said tank support member against a front of a rail of the deck;
        said tank bracing portion of said tank support member having a first member downwardly extending from said tank securing portion, a second member horizontally extending from an end of said first member for supporting a bottom of said fuel supply tank when said tank securing portion is coupled to the rail of the deck;
        said tank bracing portion of said tank support member having an annular ring coupled to said first member for engaging sides of said fuel supply tank to support said fuel supply tank; and
        said tank bracing portion of said tank support member having a tab member upwardly extending from said second member opposite said first member for engaging a side of said fuel supply for preventing said fuel supply tank from sliding of said second member.

* * * * *